United States Patent
Ogawa

(10) Patent No.: US 10,315,257 B2
(45) Date of Patent: Jun. 11, 2019

(54) DRILL AND METHOD OF MANUFACTURING MACHINED PRODUCT

(71) Applicant: Kyocera Corporation, Kyoto-shi, Kyoto (JP)

(72) Inventor: Hiroshi Ogawa, Omihachiman (JP)

(73) Assignee: KYOCERA CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 15/576,884

(22) PCT Filed: Mar. 22, 2016

(86) PCT No.: PCT/JP2016/058927
§ 371 (c)(1),
(2) Date: Nov. 27, 2017

(87) PCT Pub. No.: WO2016/189937
PCT Pub. Date: Dec. 1, 2016

(65) Prior Publication Data
US 2018/0147641 A1 May 31, 2018

(30) Foreign Application Priority Data

May 28, 2015 (JP) .................................. 2015-108749
Oct. 28, 2015 (JP) .................................. 2015-211975

(51) Int. Cl.
*B23B 35/00* (2006.01)
*B23B 51/00* (2006.01)
*B23B 51/10* (2006.01)

(52) U.S. Cl.
CPC ............ *B23B 51/009* (2013.01); *B23B 35/00* (2013.01); *B23B 51/108* (2013.01);
(Continued)

(58) Field of Classification Search
CPC . B23B 51/009; B23B 51/108; Y10T 408/906; Y10T 408/9097
See application file for complete search history.

(56) References Cited

U.S. PATENT DOCUMENTS 1,387,994 A * 8/1921 Lewis ..................... B23B 51/08
                                                                    408/224
1,747,117 A * 2/1930 Klein ..................... B23B 51/009
                                                                    408/223
(Continued)

FOREIGN PATENT DOCUMENTS

DE             19730377 A1 * 1/1999 ............. B23B 51/10
DE    202007006507 U1 *  9/2007
(Continued)

*Primary Examiner* — Eric A Gates
(74) *Attorney, Agent, or Firm* — Viering, Jentschura & Partner MBB

(57) ABSTRACT

In an embodiment, a drill has an elongated shape and a rotation axis. The drill includes a drilling portion, a shank portion, and a tapered portion. The shank portion includes a first helical flute and a first cutting edge. The tapered portion is located between the drilling portion and the shank portion. The tapered portion includes a second helical flute, a second cutting edge, a chamfered part, and a connection part. The chamfered part is getting smaller gradually as moving toward the first end side. The connection part has a curved surface and connects the second cutting edge and the drilling portion. A ratio of w/L is 0.0015-0.5 where L is a length of the second cutting edge in a front view of the first end, and w is a width of an outer peripheral end of the chamfered part in a direction parallel to the rotation axis.

20 Claims, 17 Drawing Sheets

(52) U.S. Cl.
CPC ....... *B23B 2215/04* (2013.01); *B23B 2251/04* (2013.01); *B23B 2251/14* (2013.01); *B23B 2251/20* (2013.01); *B23B 2251/408* (2013.01); *Y10T 408/906* (2015.01); *Y10T 408/9097* (2015.01)

(56) References Cited

U.S. PATENT DOCUMENTS

| | | | | |
|---|---|---|---|---|
| 2,389,909 A | * | 11/1945 | Hofbauer | B23B 51/0081 |
| | | | | 408/223 |
| 2,897,695 A | * | 8/1959 | Winslow | B23B 51/108 |
| | | | | 408/223 |
| 4,936,721 A | * | 6/1990 | Meyer | B23B 51/08 |
| | | | | 408/224 |
| 7,575,401 B1 | * | 8/2009 | Garrick | B23B 51/02 |
| | | | | 408/145 |
| 8,070,399 B2 | * | 12/2011 | Capone | B23B 51/02 |
| | | | | 408/144 |
| 9,004,826 B2 | * | 4/2015 | Wedner | B23B 51/009 |
| | | | | 408/223 |
| 9,623,488 B2 | * | 4/2017 | Ono | B23B 51/009 |
| 2012/0051863 A1 | * | 3/2012 | Craig | B23B 51/08 |
| | | | | 408/1 R |
| 2015/0093205 A1 | * | 4/2015 | Krenzer | B23B 51/009 |
| | | | | 408/1 R |

FOREIGN PATENT DOCUMENTS

| | | | | | |
|---|---|---|---|---|---|
| GB | 155004 | A | * | 12/1920 | ........... B23B 51/009 |
| GB | 2405820 | A | * | 3/2005 | ........... B23B 51/009 |
| JP | 04041113 | A | * | 2/1992 | |
| JP | H0631517 | A | | 2/1994 | |
| JP | 2001105216 | A | * | 4/2001 | |
| JP | 2003334709 | A | * | 11/2003 | |
| JP | 2004291189 | A | * | 10/2004 | |
| JP | 2006346832 | A | * | 12/2006 | |
| SU | 1804960 | A1 | * | 3/1993 | |

* cited by examiner

DRILL AND METHOD OF MANUFACTURING MACHINED PRODUCT

RELATED APPLICATIONS

The present application is a national stage entry according to 35 U.S.C. § 371 of PCT application No. PCT/JP2016/058927 filed on Mar. 22, 2016, which claims priority from Japanese application No. 2015-108749 filed on May 28, 2015, and Japanese application No. 2015-211975 filed on Oct. 28, 2015, and are incorporated herein by reference in its entirety.

TECHNICAL FIELD

The present embodiment relates to a drill and a method of manufacturing a machined product.

BACKGROUND

Metal aluminum is lightweight and used for materials for aircrafts, or the like. For example, when metal aluminum is used as a body of an aircraft, it is necessary to form a through hole for fastening a rivet. For use in machining such a through hole, for example, Patent Document 1 discloses a drill capable of machining an inlet of the through hole into a tapered surface by disposing a second cutting edge on a rear side of a drilling portion.

RELATED ART DOCUMENT

Patent Document

Patent Document 1: Japanese Unexamined Patent Publication No. 6-031517

SUMMARY

In an embodiment, a drill has an elongated shape and a rotation axis. The drill includes a drilling portion, a shank portion and a tapered portion. The drilling portion is located on a first end side. The shank portion is located on a second end side, and includes a first helical flute and a first cutting edge. The first cutting edge is located on the first end side of the first helical flute. The tapered portion is located between the drilling portion and the shank portion, and has a diameter that is larger on the second end side larger than on the first end side. The tapered portion includes a second helical flute, a second cutting edge, a chamfered part and a connection part. The second helical flute is connected to the first helical flute. The second cutting edge is located on the first end side of the second helical flute. The chamfered part is located along the second cutting edge, and is getting smaller gradually as moving toward the first end side. The connection part has a curved surface and connects the second cutting edge and the drilling portion. A ratio of w/L is 0.0015-0.5 where L is a length of the second cutting edge in a front view of the first end, and w is a width of an outer peripheral end of the chamfered part in a direction parallel to the rotation axis.

In an embodiment, a method of manufacturing a machined product includes the steps of: rotating the drill; drilling a hole by causing contact between the first cutting edge of the drill being rotated and a workpiece; cutting an opening of the drilled hole by causing contact between the second cutting edge of the drill being rotated and the workpiece; and pulling the drill from a hole formed in the workpiece by separating the workpiece and the drill from each other.

EMBODIMENTS

Drill of First Embodiment

A drill according to the first embodiment is described in detail below with reference to FIGS. 1 to 11.

Figure 1:
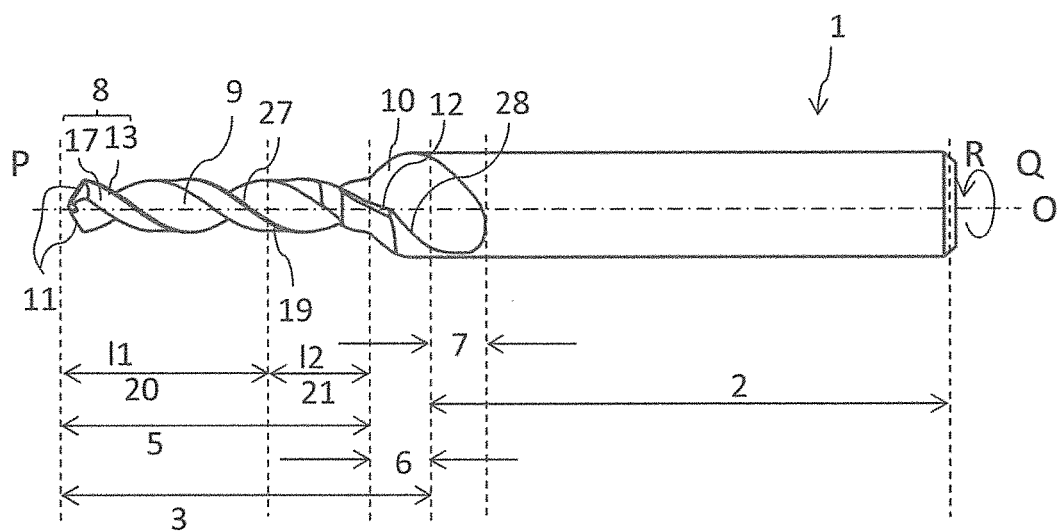
FIG. 1 is a side view of a drill according to a first embodiment.
Figure 2:
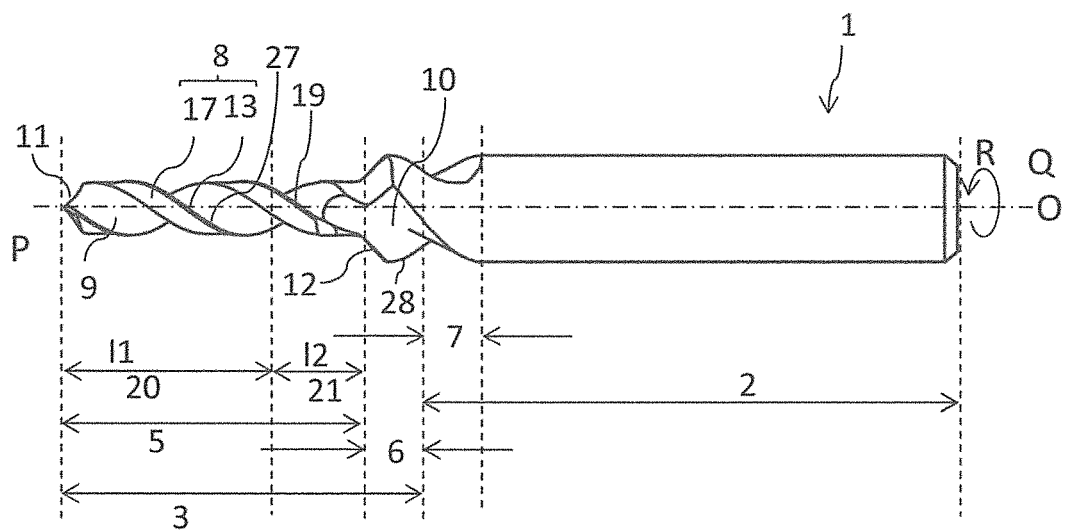
FIG. 2 is a side view of the drill in FIG. 1 that is rotated 90°.

As shown in FIG. 1, the drill 1 of the present embodiment includes a rotation axis O and is rotatable in an arrowed direction R around the rotation axis O. The drill 1 includes a drilling portion 5 located on a first end (P) side, a shank portion 2 located on a second end (Q) side, and a tapered portion 6 located between the drilling portion 5 and the shank portion 2. In the present embodiment, a side identified by an alphabetic character P is defined as "a first end," and a side identified by an alphabetic character Q is defined as "a second end." The first end side is referred to simply as "P side," and the second end side is referred to as "Q side" in the following description. The tapered portion 6 includes a diameter on the Q side is larger than on the P side. The shank portion 2 is designed to be held by a machine tool (not shown).

Examples of the machine tool that holds the shank portion 2 include a hand drill and a machining center. The drilling portion 5 and the tapered portion 6 are involved in cutting, and are defined as a cutting portion 3 in the present embodiment. The cutting portion 3 is designed to be brought into contact with a workpiece. As shown in FIGS. 1 to 4, the drilling portion 5 is located on the P side. The drill 1 of the present embodiment is an elongated body having an approximately columnar shape.

The drilling portion 5 is designed to enter a workpiece when the workpiece is subjected to a drilling process by the drill 1. The drilling portion 5 includes a first helical flute 9 and a first cutting edge 11 located on the P side in the first helical flute 9. The first cutting edge 11 is hereinafter referred to as a front end cutting edge 11.

The shank portion 2 includes a raised part 7 on the P side that connects to the tapered portion 6. A second helical flute 10 is raised along the raised part 7.

Figure 3:
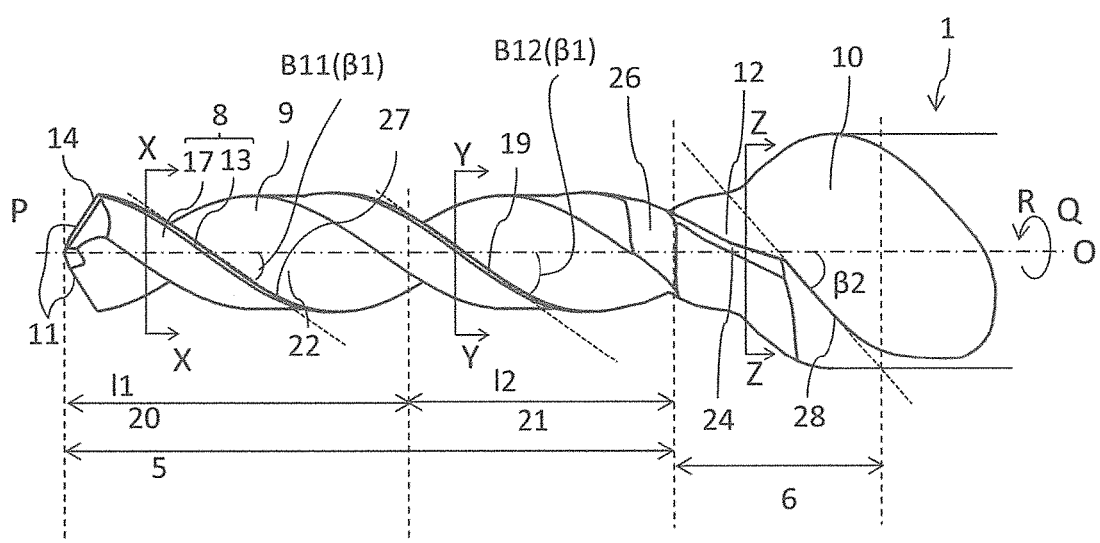
FIG. 3 is an enlarged view of a first end side of the drill shown in FIG. 1.
Figure 5:
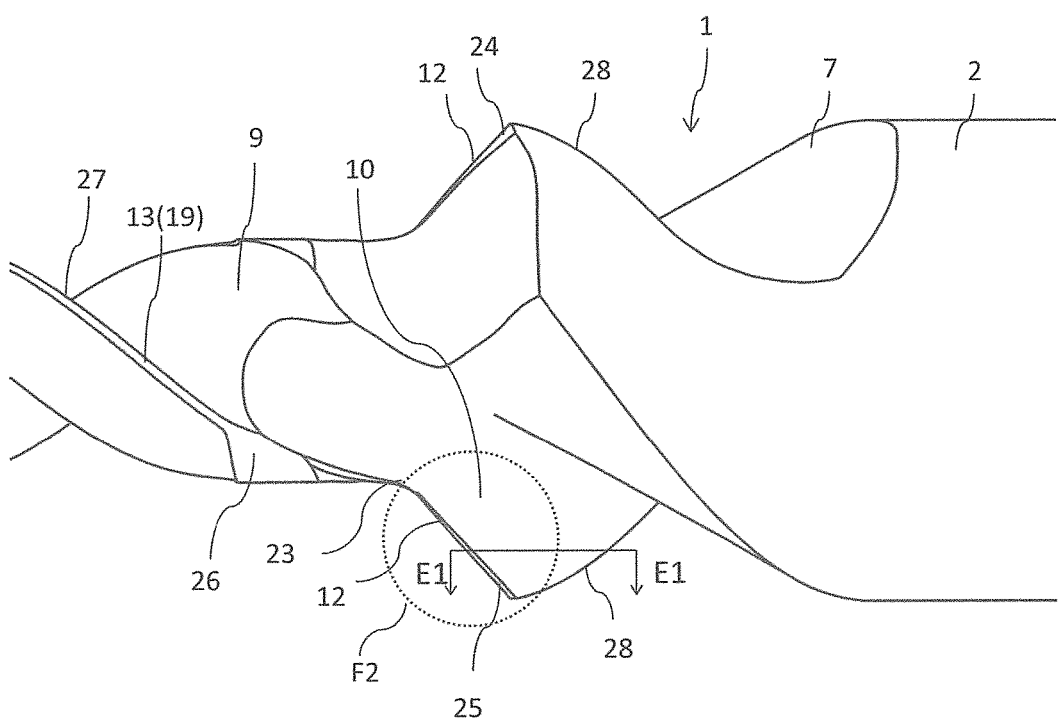
FIG. 5 is an enlarged view of an F1 part of the drill shown in FIG. 4.

The tapered portion 6 is located between the drilling portion 5 and the shank portion 2. The tapered portion 6 includes a second cutting edge 12 whose diameter increases from the P side to the Q side, in other words, from the drilling portion 5 to the shank portion 2. The second cutting edge 12 is hereinafter referred to as the tapered cutting edge 12. The tapered cutting edge 12 is for making into a tapered shape by increasing a diameter of the hole, and for removing burrs generated during the drilling process at an opening of a drilled hole formed by the drilling portion 5. The tapered portion 6 includes a second helical flute 10 connecting to the first helical flute 9, a tapered cutting edge 12 located on the P side of the second helical flute 10, and a chamfered part 25 located along the tapered cutting edge 12. As shown in FIGS. 3 and 5, the taper 6 includes a second leading edge 28 that follows an outer peripheral end of the tapered cutting edge 12 and extends toward the Q side, and a tapered flank surface 24 connecting to a side of the tapered cutting edge 12 which is opposite to the second helical flute 10.

Figure 6:
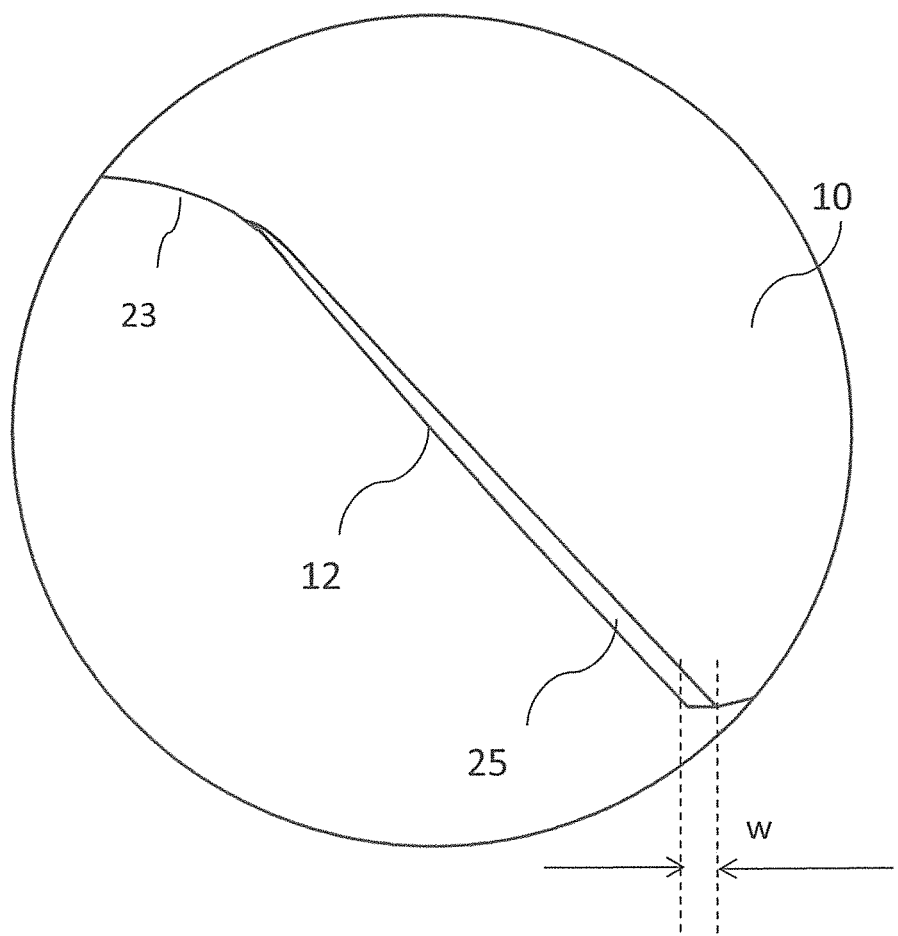
FIG. 6 is an enlarged view of an F1 part of the drill shown in FIG. 5.

In the present embodiment, a chamfered part 25 is located along the tapered cutting edge 12 on the second helical flute 10 as shown in FIG. 6. The tapered cutting edge 12 is adjacent to the chamfered part 25, and the chamfered part 25 is adjacent to the second helical flute 10. Here, w/L is 0.0015-0.5 when w is a width in a direction parallel to the rotation axis O at the outer peripheral end of the chamfered part 25 shown in FIG. 6 (hereinafter also referred to simply as "a width w"), and L is a length of the tapered cutting edge 12 in a front view of a first end P shown in FIG. 8. Also in the present embodiment, a connection part 23 of the tapered cutting edge 12 and the drilling portion 5 is in connection through a curved surface, and the width w of the chamfered part 25 gradually decreases toward the P side as shown in FIG. 6. Because the tapered cutting edge 12 is directed toward the P side and located on the rotation axis O side, it can also be said that the width w of the chamfered part 25 gradually decreases from the outer peripheral end to the rotation axis O. Because the present embodiment satisfies the foregoing configuration, fracture resistance of the tapered cutting edge 12 can be enhanced, and chips generated at the tapered cutting edge 12 can smoothly be guided into the second helical flute 10 and then discharged to the outside, thus leading to stable chip discharge performance.

Figure 17:
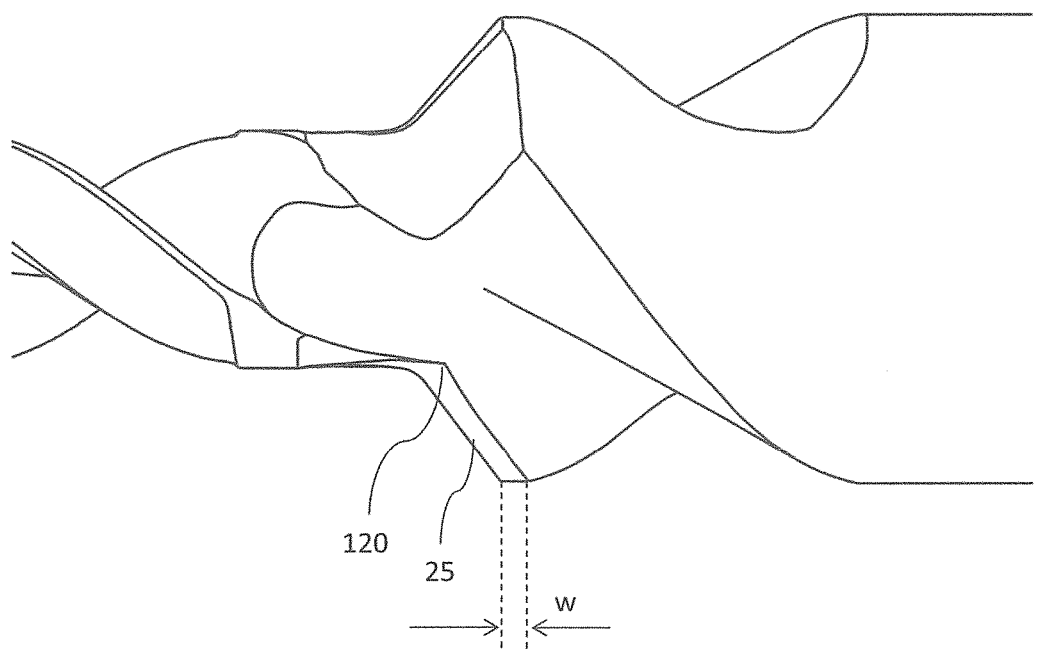
FIG. 17 is a side view that shows in an enlarged dimension a main part of a drill in which a width w of a chamfered part gradually increases toward a first end side.

When w/L is smaller than 0.0015, the outer peripheral end of the tapered cutting edge 12 is susceptible to fracture. When w/L is larger than 0.5, the chips generated at the tapered cutting edge 12 may come into contact with the chamfered part 25, and a flow direction of the chips may be turned, so that the chips are not guided into the second helical flute 10, thus failing to control the flow direction of the chips. Consequently, the chips may come into contact with a machined surface of the workpiece, and may damage the machined surface. As shown in FIG. 17, when the width w of the chamfered part 25 remains unchanged or gradually increases toward the P side, a large corner part 120 is formable at a part of the chamfered part 25 which is close to the P side. The corner part 120 may obstruct the flow of chips. As a result, the chips may fly out of the second helical flute 10, or the corner part 120 may be subjected to welding of ingredients of chips, so that the tapered cutting edge 12 is fractured with the corner part 120 as a starting point.

Because the P side in the tapered cutting edge 12 is a position of the tapered cutting edge 12 which is first brought into contact with the workpiece, the P side part of the tapered cutting edge 12, namely, a part of the second helical flute 10 which is close to the rotation axis O is a position having significant influence on the flow direction of generated chips. The outer peripheral end side of the tapered cutting edge 12 which is located close to the outer peripheral side of the chamfered part 25 is a position that is most subjected to impact. The drill 1 of the present embodiment has the configuration that the chamfered part 25 gradually becomes smaller toward the P side, and w/L is 0.0015-0.5. It is therefore possible to enhance the fracture resistance of the tapered cutting edge 12 and smoothly guide the chips generated at the tapered cutting edge 12 into the second helical flute 10 so as to be discharged to the outside, thereby having stable chip discharge performance. In the present embodiment, a maximum diameter D of the drilling portion 5 is settable to 4.0-6.5 mm.

When a terminal end of the rotation axis O side of the chamfered part 25 exists at a position that comes into contact with the connection part 23 as shown in FIGS. 5 and 6, the flow of chips becomes smoother. The connection part 23 in the present embodiment denotes a region made into a curved line in a side view.

When the chamfered part 25 includes an axial inclination angle $\theta$ of 0-30° in the present embodiment, it is easy to guide the chips generated at the tapered cutting edge 12 into the second helical flute 10, and the fracture resistance of the tapered cutting edge 12 can be enhanced. The term "an axial inclination angle $\theta$ of the chambered part 25" denotes an angle $\theta$ formed by a line connecting the tapered cutting edge 12 and a straight line parallel to the rotation axis O, and an imaginary extension line of the chamfered part 25. The inclination angle $\theta$ is constant from the rotation axis O side to the outer peripheral side in the present embodiment. Without limiting this, the inclination angle $\theta$ may vary in a range from the rotation axis O side to the outer peripheral side.

Figure 8:
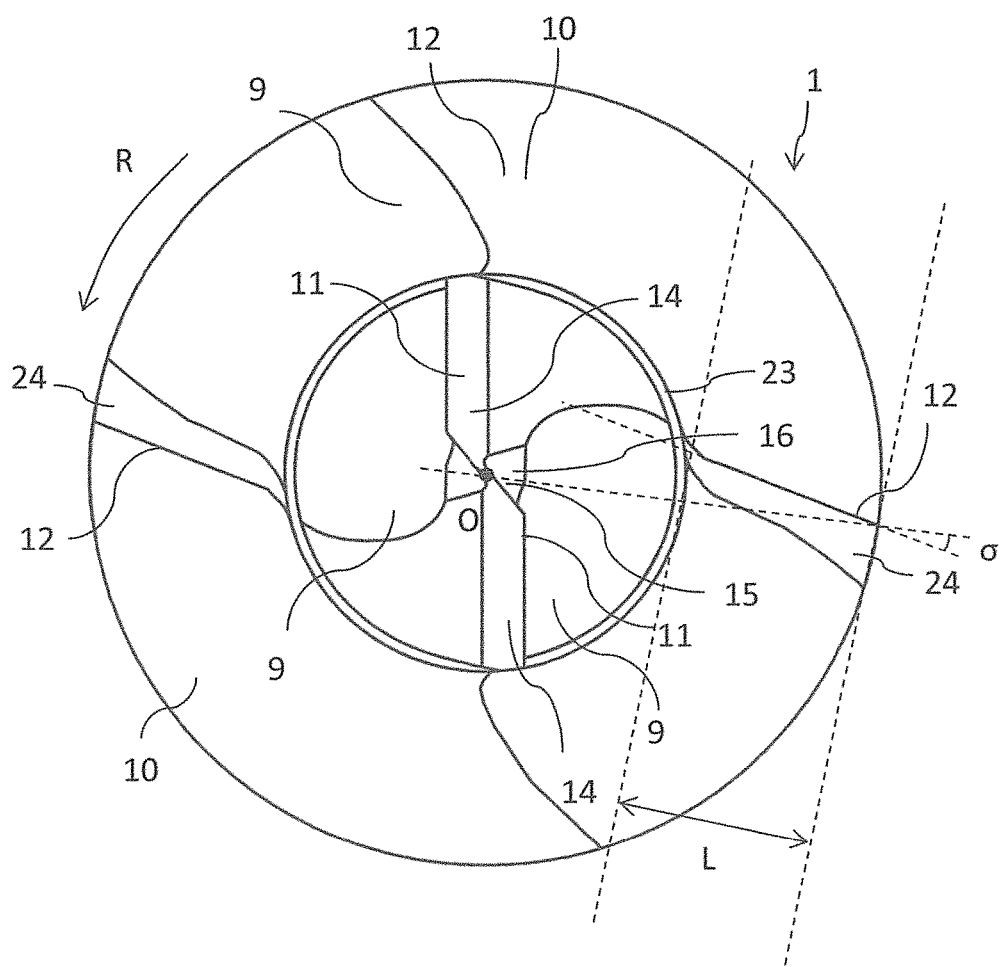
FIG. 8 is a front view of a first end of the drill shown in FIG. 3.

When a radial rake $\sigma$ of the tapered cutting edge 12 is $-5°$ to $-25°$ as shown in FIG. 8, chips generated from the tapered cutting edge 12 curl slightly and the chips are divided into small pieces, which are therefore easily dischargeable from the second helical flute 10. The term "a radial rake $\sigma$ of the tapered cutting edge 12" denotes a radial rake angle as shown in FIG. 8.

When the axial inclination angle $\alpha$ on the rotation axis O side in the second helical flute 10 that follows the chamfered part 25 of the tapered cutting edge 12 is smaller than on the outer peripheral side, fracture resistance is not apt to deteriorate even when cutting resistance is large, at a position near the connection part 23 in the tapered cutting edge 12. Additionally, cutting performance can be enhanced and the wear resistance in the tapered cutting edge 12 can be enhanced at a position near the outer peripheral end of the tapered cutting edge 12. In the drill 1 of the present embodiment, although not shown, the axial inclination angle $\alpha$ of the second helical flute 10 that follows the chamfered part 25 of the tapered cutting edge 12 gradually increases from the rotation axis O side toward the outer peripheral side.

Figure 7:
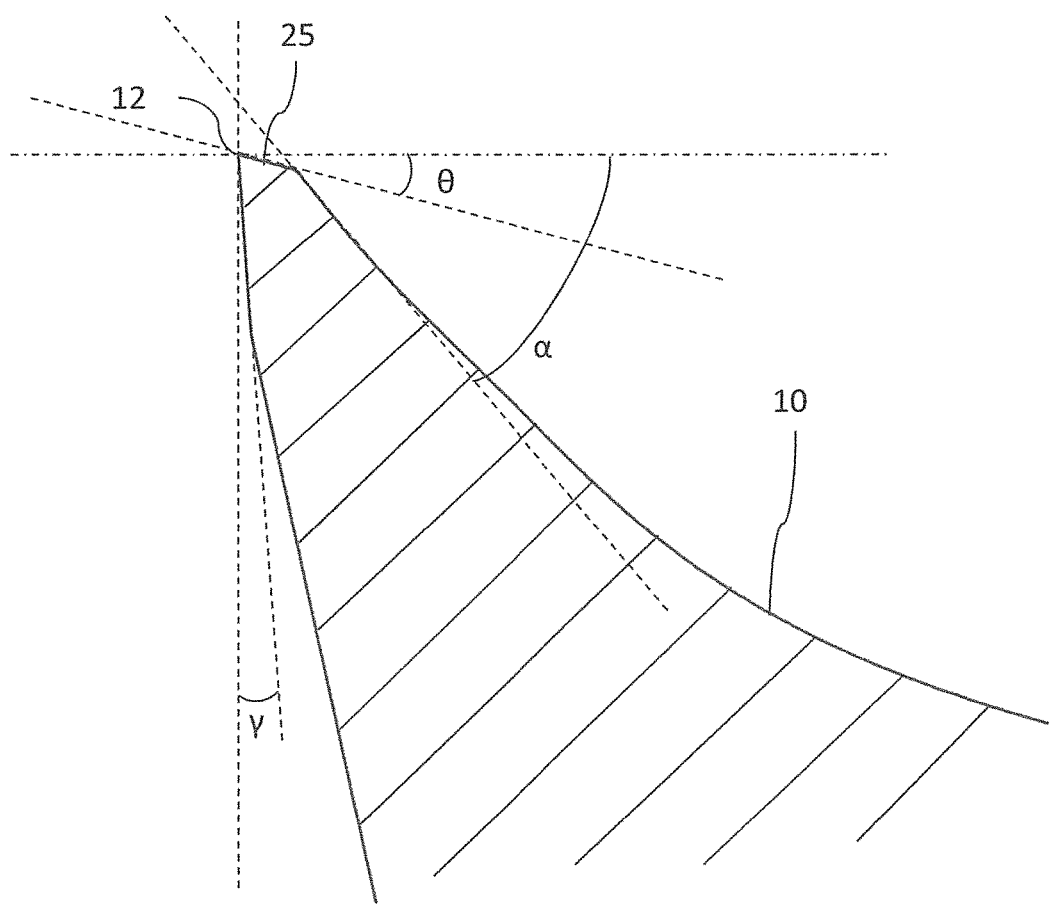
FIG. 7 is a sectional view taken along E1-E1 of the drill shown in FIG. 5.

When a clearance angle (referred also to as a taper clearance angle) γ of the tapered cutting edge 12 is 5-30° as shown in FIG. 7, the tapered cutting edge 12 compatibly has good wear resistance and good fracture resistance. In the present embodiment, the clearance angle γ is constant from the rotation axis O side to the outer peripheral end side. Without limiting this, the clearance angle γ may vary in a range from the rotation axis O side to the outer peripheral end side.

Figure 9:
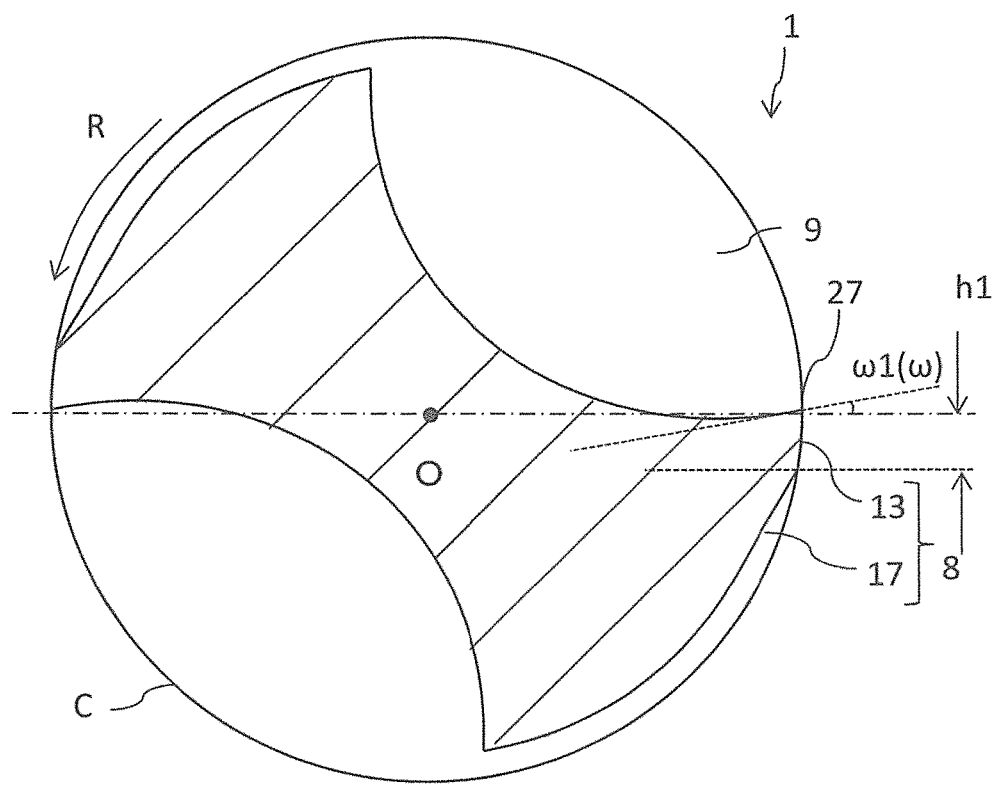
FIG. 9 is a sectional view taken along X-X in FIG. 3.
Figure 10:
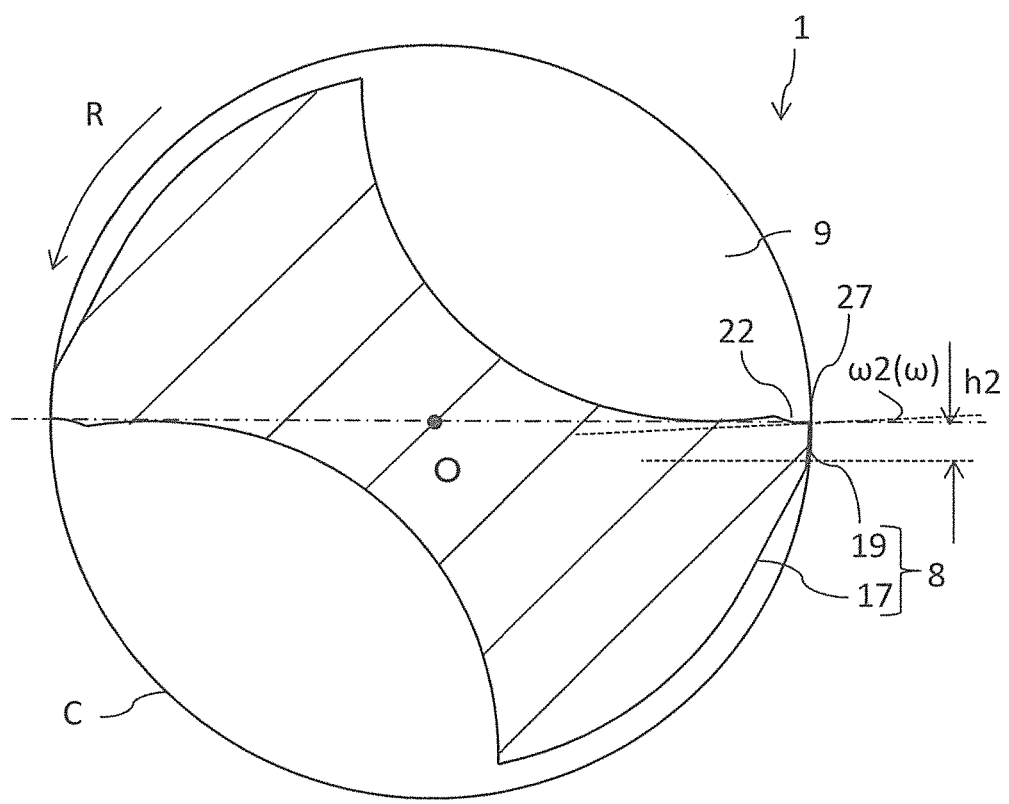
FIG. 10 is a sectional view taken along Y-Y in FIG. 3.
Figure 11:
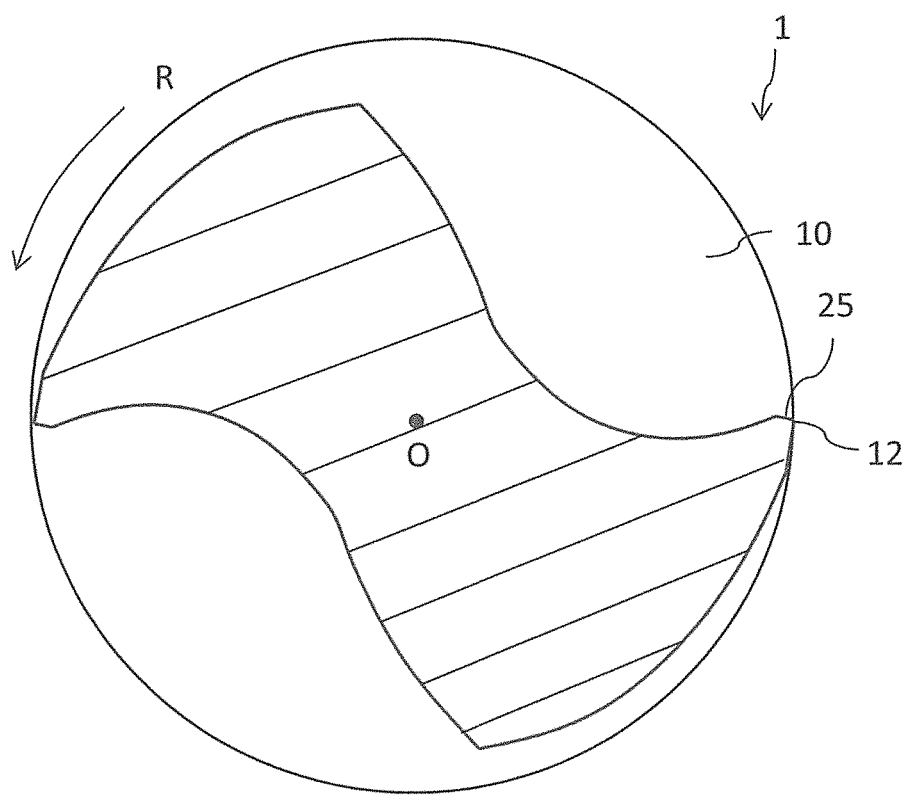
FIG. 11 is a sectional view taken along Z-Z in FIG. 3.
Figure 12:
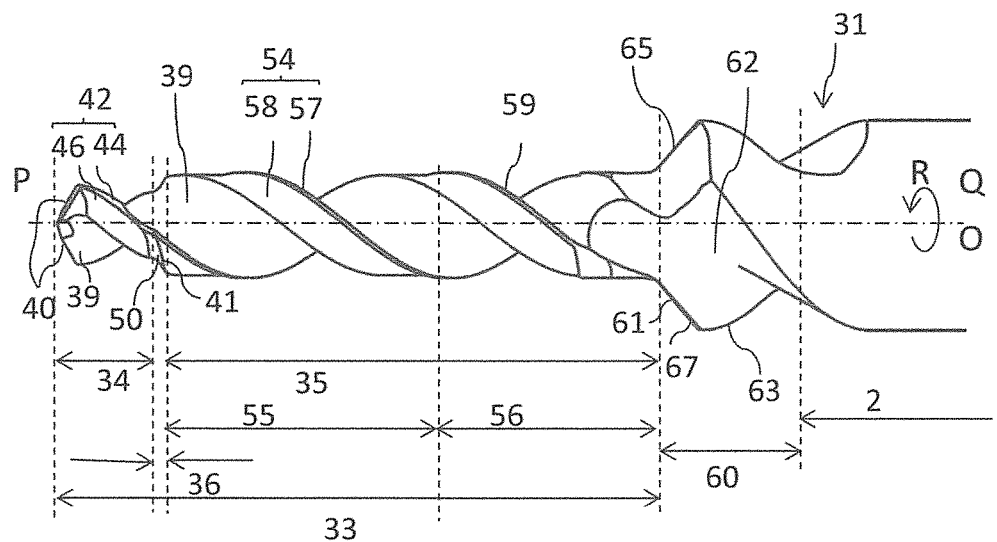
FIG. 12 is a side view that shows a drill according to a second embodiment.
Figure 13:
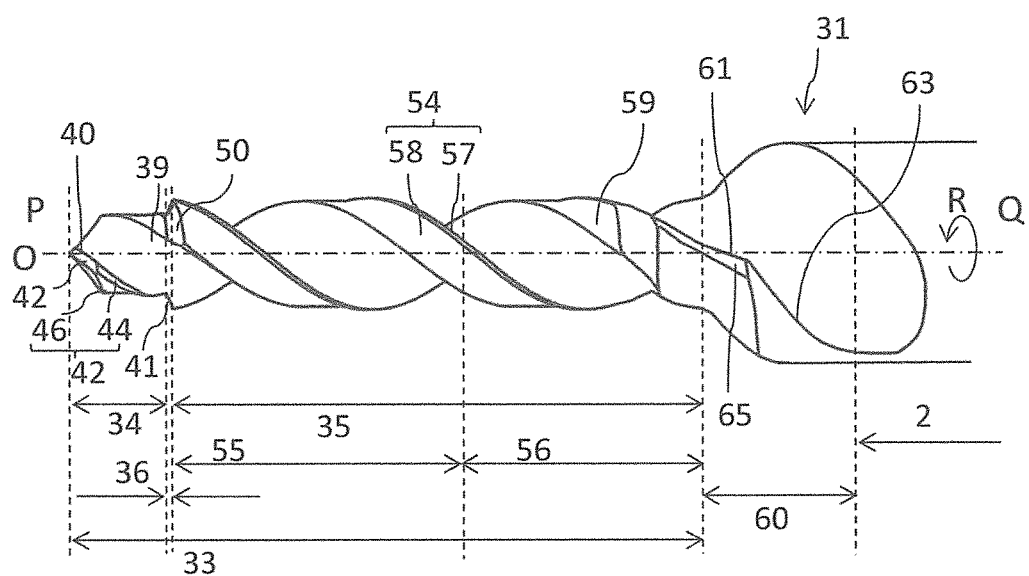
FIG. 13 is a side view when the drill shown in FIG. 12 is rotated 90°.

As shown in FIGS. 8 and 11, the second helical flute 10 is located in a rotation direction R side of the tapered cutting edge 12. Chips generated at the tapered cutting edge 12 are guided through the chamfered part 25 into the second helical flute 10, and are discharged to a Q side along a shape of the second helical flute 10. Meanwhile, the first helical flute 9 is located on the rotation direction R side of the first leading edge 27 extending from the outer peripheral end of the front end cutting edge 11 of the drilling portion 5 toward the Q side as shown in FIGS. 9 and 10.

Figure 4:
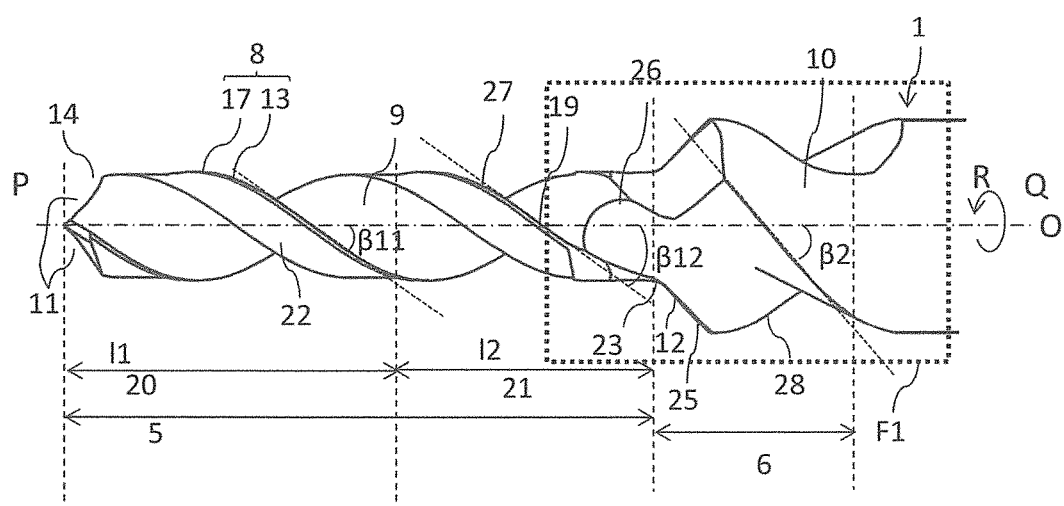
FIG. 4 is an enlarged view of a first end side of the drill shown in FIG. 2.

Both of the first helical flute 9 and the second helical flute 10 may be formed by one processing. Alternatively, after the first helical flute 9 or the second helical flute 10 is formed first, the other helical flute (the second helical flute 10 or the first helical flute 9) may be formed. In the present embodiment, a helix angle β2 of the second helical flute 10 is larger than a helix angle β1 of the first helix flute 9 as shown in FIGS. 3 and 4. Consequently, the chips are more easily guided into the second helical flute 10. An angle formed by the first leading edge 27 and the rotation axis O is defined as a first helix angle β1, and an angle formed by the second leading edge 28 and the rotation axis O is defined as a second helix angle β2 in a side view in FIG. 3.

In the first embodiment, the drill 1 includes two pieces of each of the first helical flute 9 and the second helical flute 10, and two pieces of each of the front end cutting edge 11 and the tapered cutting edge 12. As shown in FIG. 8, the first helical flute 9, the second helical flute 10, the front end cutting edge 11, and the tapered cutting edge 12 are located at predetermined intervals with rotational symmetry with respect to the rotation axis O. The number of the first helical flute 9, the second helical flute 10, the front end cutting edge 11, and the tapered cutting edge 12 may be one, or alternatively three or more. Usually, any number is selectable from a range of 1 to 5.

As shown in FIG. 8, the drilling portion 5 includes the front end cutting edge 11 located on the P side of the first helical flute 9, and a front end flank surface 14 at a position opposite to a rotation direction R of the drill with respect to the front end cutting edge 11. The front end flank surface 14 includes a front end clearance angle (not shown) of 5-20° with respect to a plane vertical to the rotation axis O. In FIG. 8, the drill 1 includes a chisel edge part 15 where a plurality of the front end flank surfaces 14 intersect with each other, and further includes a thinning part 16 obtainable by polishing a part of the chisel edge part 15 in order to decrease a core thickness. The thinning part 16 makes it easier for the front end cutting edge 11 to bite into a workpiece. The thinning part 16 may be omitted.

As shown in FIGS. 1 to 4, 9, and 10, the drilling portion 5 includes the first helical flute 9 located on a side surface on the P side, the first leading edge 27 extending toward the Q side that follows the outer peripheral end of the front end cutting edge 11, and an outer peripheral part 8 adjacent in a reverse direction to the rotation direction R of the first leading edge 27. The drilling portion 5 may have a planar shape at a position connecting to the front end cutting edge 11 of the first helical flute 9. The outer peripheral part 8 is a region of a side surface of the drilling portion 5, except for the first helical flute 9.

In the present embodiment, a margin part 13 is located at a front edge in the rotation direction of the drill in an opening end of the first helical flute 9. In other words, the margin part 13 is located at one of two opening ends of the first helical flute 9 which is located on a side opposite to the rotation direction R. The margin part 13 has a guiding function of stabilizing an advance direction of the drill 1 by being slidingly contacted with an inner wall surface of a drilled hole when a workpiece is cut by the front end cutting edge 11. The outer peripheral part 8, except for the margin part 13, is a clearance part 17, whose distance from the rotation axis O corresponding to a radial thickness of the clearance part 17 is shorter than a distance from the rotation axis O corresponding to a radial thickness of the margin part 13. Accordingly, the clearance part 17 has no contact with the inner wall surface of the drilled hole, thus causing no frictional heat due to contact. Therefore, the inner wall surface of the drilled hole is less likely to occur.

With the present embodiment, the margin part 13 is cut out toward an opening side of the first helical flute 9 on the Q side of the margin part 13 as shown in FIG. 7 that is a sectional view taken along E1-E1 shown in FIG. 5. In the present embodiment, the cut out margin part 13 is referred to as a small margin part 19. A region of the drilling section 5 which includes the small margin part 19 is referred to as a rear region 21, and a region of the drilling section 5 which includes an uncut out margin part 13 is referred to as a front region 20. The rear region 21 contributes to reducing the liability that the small margin part 19 bites into a workpiece when the small margin part 19 is brought into contact with the inner wall surface of a drilled hole. Therefore, chatter vibration is less likely to occur in the drill 1. Moreover, because the guiding performance of the rear region 21 is also ensured by the small margin part 19, the rear region 21 is less likely to damage the inner wall surface of the drilled hole when the drill 1 is pulled out of the workpiece after the drilling process by the drill 1. An outer circle C in each of FIGS. 9 and 10 is a rotation locus of the outer peripheral end of the front end cutting edge 11, namely, the inner wall surface of the drilled hole subjected to the drilling process by the drill 1. For the sake of easy comparison between the margin part 13 and the small margin part 19 in terms of arrangement or the like, FIGS. 9 and 10 show in a direction in which the margin part 13 and the small margin part 19 are rotated so as to be directed in the same direction.

In FIG. 3, a helix angle β12 of the first helical flute 9 in the small margin part 19 is smaller than a helix angle β11 of the first helical flute 9 in the margin part 13. Consequently, the rear region 21 is less likely to bite into the workpiece. The helix angle β2 of the second helical flute 10 is smaller than a helix angle β12 at the rear region 21 of the first helical flute 9. Accordingly, the width w of the chamfered part 25 in the tapered cutting edge 12 gradually decreases as going from the outer peripheral end toward the rotation axis O. Consequently, the strength of the cutting edge is retainable, and the tapered cutting edge 12 is less likely to fracture.

Further in the present embodiment, an inclination angle ω2 on the Q side of the small margin part 13 shown in FIG. 10, namely at the outer peripheral end of the small margin part 19 of the rear region 21 is smaller than an inclination angle ω1 on the P side of the margin part 13 shown in FIG. 9, namely at the outer peripheral end of the margin part 13 of the front region 20 in a sectional view. The inclination angle ω denotes a direction of an opening surface of the first helical flute 9 at the outer peripheral end of the margin part 13 in a cross section vertical to the rotation axis O shown in FIGS. 9 and 10. The inclination angle ω is indicated by an angle formed by a straight line connecting the end part of the margin part 13 and the rotation axis O, and a tangent of the opening surface of the first helical flute 9 at the outer peripheral end of the margin part 13. That is, the inclination angle ω1 is indicated by a direction of the first helical flute 9, and the inclination angle ω2 is indicated by a direction of a cut out part 22. Accordingly, the margin part 13 is less likely to bite in the rear region 21, and chatter vibration is less likely to occur in the rear region 21.

With reference to FIG. 10, the shape of the cut out part 22 of the small margin part 19 is a concave curved surface with respect to the opening part of the first helical flute 9 in a sectional view. Owing to this, chips are less likely to be pulled toward the inner wall surface of the drilled hole by the small margin part 19 in the rear region 21, and the chips are less likely to held and caught between the small margin part 19 and the inner wall surface of the drilled hole. As shown in FIG. 9, the margin part 13 is not cut out and has high guiding performance at the margin part 13 in the front region 20.

A width h2 of the small margin part 19 is smaller than a width h1 of the margin part 13. Thus, chatter vibration is less likely to occur in the rear region 21. The width of the margin part 13 and the width of the small margin part 19 are observable in the cross portion vertical to the rotation axis O as shown in FIGS. 9 and 10.

Because the front region 20 is located at a position close to the front end cutting edge 11, the front region 20 is less apt to come into contact with the inner wall surface of the drilled hole. A ratio (12/11) of a length 11 of the front region 20 in the rotation axis O direction and a length 12 of the rear region 21 in the rotation axis O direction is 0.2-0.8.

In the present embodiment, a guide part 26 including a width larger than the margin part 13 is located on the Q side connecting to the connection part 23 of the drilling portion 5. This contributes to enhancing accuracy of a machining position when cutting is carried out by the tapered cutting edge 12.

Drill of Second Embodiment

Although the outer peripheral part 8 of the drilling portion 5 has the same diameter over the entire length, the present embodiment is not limited thereto. FIGS. 12 to 15 show a step drill according to the second embodiment which is provided with a step whose diameter increases toward a Q side in the middle of the outer peripheral part 8 of the drilling portion 5.

The drill 31 includes a drilling portion 33 and a tapered portion 60. Similarly to the first embodiment, the configuration of the tapered portion 60 includes a second cutting edge 61, a second helical flute 62, a second leading edge 63, a tapered flank surface 65, and a chamfered part 67. Because the configuration of the tapered portion 60 is similar to that in the first embodiment, a description thereof is omitted here.

The drilling portion 33 includes a small diameter part 34 located on a P side, a large diameter part 35 located close to the Q side, namely, the tapered portion 60, and a step part 36 located between the small diameter part 34 and the large diameter part 35.

Figure 15:
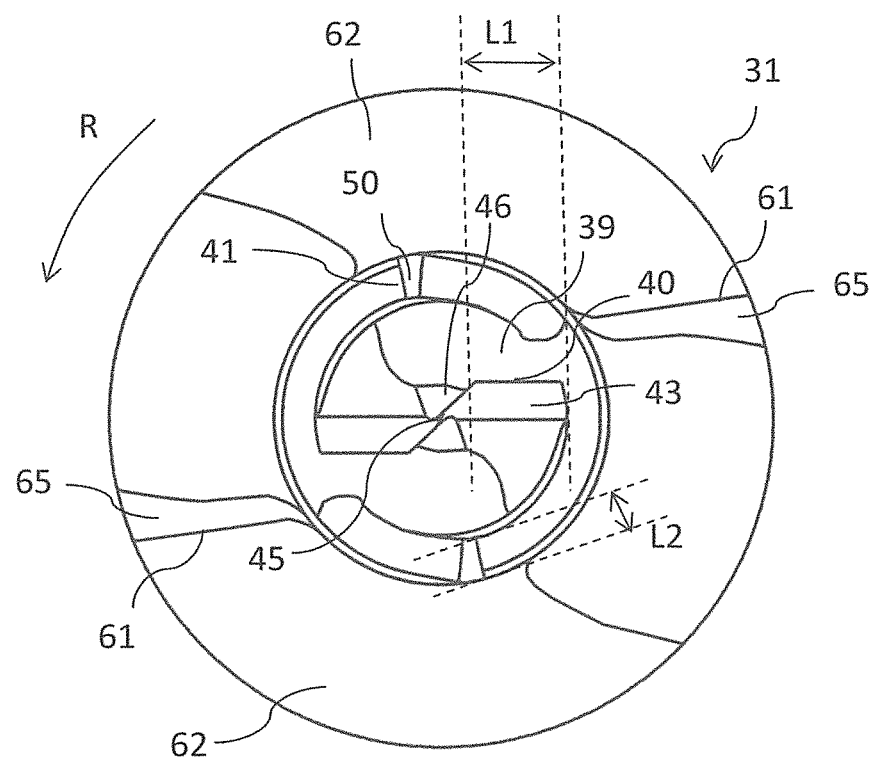
FIG. 15 is a front view of a first end of the drill shown in FIG. 12.

The small diameter part 34 includes a first cutting edge 40, a first helical flute 39, and a first outer peripheral part 42. The small diameter part 34 includes a first margin portion 44 at a front edge in a rotation direction R of the drill in the first outer peripheral part 42. The first outer peripheral part 42, except for the first margin portion 44, is a first clearance portion 46. As shown in FIG. 15, the small diameter part 34 further includes a first flank surface 43, a chisel edge 45, and a thinning part 46 as in the case with the drill 1.

Chips generated by the first cutting edge 40 are discharged through the first helical flute 39 toward the rear of the drilling portion 33. The first helical flute 39 is located correspondingly to the first cutting edge 40. The number of a plurality of the first helical flutes 39 is equal to the number of the first cutting edges 40. A helix angle β4 (not shown) that is an angle formed by the rotation axis O of the first helical flute 39 in the small diameter part 34 is 10-45°.

The step part 36 includes a stepped cutting edge 41, the first helical flute 39, and a second flank surface 50. The second flank surface 50 includes a front end flank surface (not shown) of 5-20° with respect to a plane vertical to the rotation axis O.

Chips generated by the stepped cutting edge 41 are also discharged through the first helical flute 39 toward the rear of the drilling portion 33. That is, both of the chips generated by the first cutting edge 40 and the chips generated by the stepped cutting edge 41 are discharged through the first helical flute 30 toward the rear of the drilling portion 33.

A ratio (L2/L1) of a length L1 of the first cutting edge 40 and a length L2 of the stepped cutting edge 41 is 0.1-1 in a front view taken from a first end (P) shown in FIG. 15. The stepped cutting 41, which has a relatively high circumferential velocity and is susceptible to load, is less likely to fracture. Additionally, cutting resistance of the first cutting edge 40 is reducible by carrying out cutting at the stepped cutting edge 41. A particularly suitable range of the ratio (L2/L1) is 0.2-0.5.

The large diameter part 35 includes a first helical flute 39 and a second outer peripheral part 54. The large diameter part 35 includes a first large diameter part 55 close to a step part 36, namely the P side, and a second large diameter part 56 close to the shank portion 2, namely the Q side. The first large diameter part 55 includes, in an opening end of the first helical flute 39, a second margin portion 57 at a front edge in the rotation direction R of the drill in the second outer peripheral part 54. The second large diameter part 56 includes, in the opening end of the first helical flute 39, a third margin portion 59 at a front edge in the rotation direction R of the drill in the second outer peripheral part 54. The second outer peripheral part 54, except for the second margin portion 57 and the third margin portion 59, is a second clearance part 58. A distance between the second margin portion 57 and the rotation axis O, and a distance between the third margin portion 59 and the rotation axis O are the same.

The third margin portion 59 has a cut out portion (not shown) close to the first helical flute 39, and corresponds to the small margin part 19 of the first embodiment. In the second embodiment, a width (not shown) of the first margin portion 44 is smaller than a width (not shown) of the second margin portion 57. This contributes to reducing cutting resistance in the first cutting edge 40, thereby enhancing wear resistance in the first cutting edge 40, and enhancing straightness of a drilled hole machined by the small diameter part 34.

Figure 14:
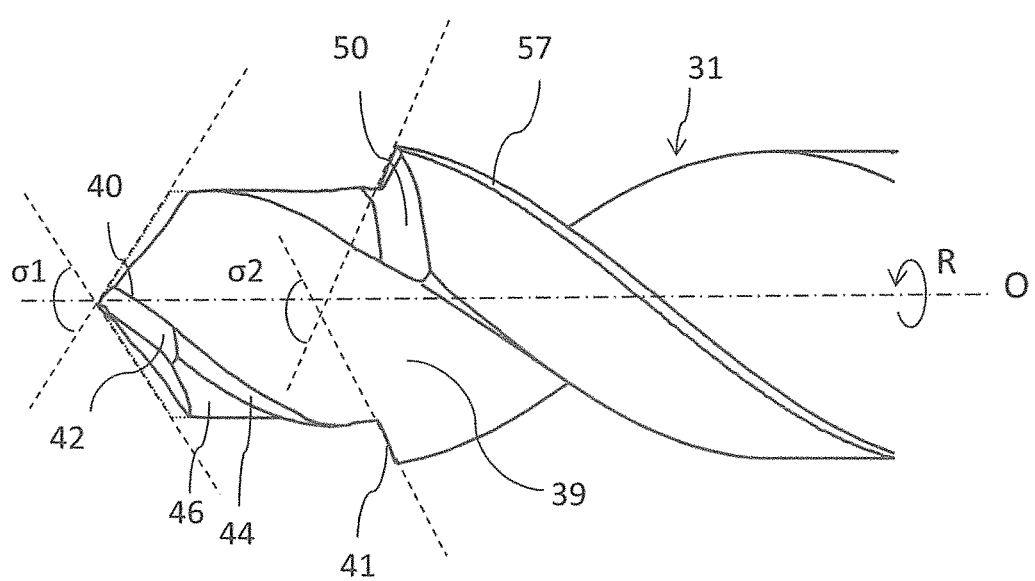
FIG. 14 is an enlarged view of a first end side of the drill shown in FIG. 12.

In FIG. 14, a front end angle σ1 of the small diameter part 34 is 90-130°, an angle formed between inclination angles of the step part 36, namely, a front end angle σ2 of the stepped cutting edge 41 is 120-150°, and σ2 is larger than σ1. This leads to high straightness of the first cutting edge 40 in the small diameter part 34. Moreover, good chip discharge performance is obtainable by reducing entanglement of chips in the stepped cutting edge 41.

<Method of Manufacturing Machined Product>

An embodiment of a method of manufacturing a machined product according to the present embodiment is described below with reference to FIG. 16. In FIG. 16, a drilling process is carried out using the drill 1.

Figure 16A:
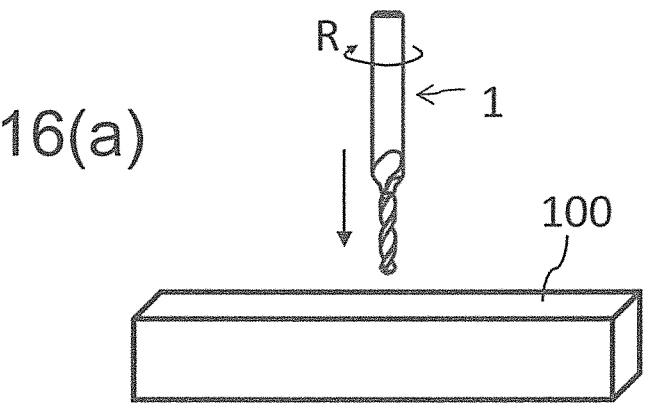
FIG. 16 is a diagram that describes, in the order to steps, a method of manufacturing a machined product according to the present embodiment.

The first step includes rotating the foregoing drill 1 in an arrowed direction R around the rotation axis O as shown in FIG. 16A.

Figure 16B:
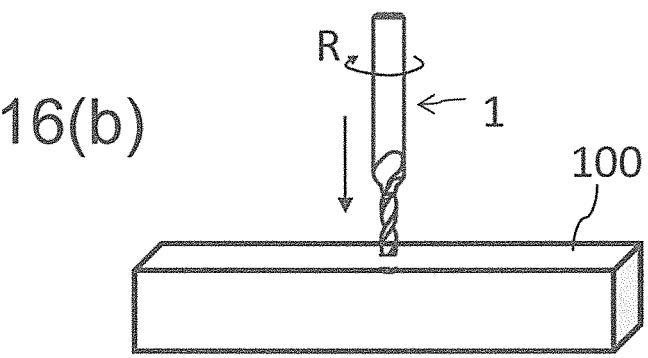

The subsequent step includes forming a hole 101 by a drilling process by causing contact between the front end cutting edge of the drill 1 being rotated and a workpiece 100, while feeding the drill 1 in an arrowed direction, as shown in FIG. 16B. As the workpiece 100, one which contains an easily bendable material, such as aluminum or aluminum alloy, is suitably usable. Alternatively, the workpiece 100 may be one in which an aluminum material and another material, such as titanium alloy, are laminated one upon another. This workpiece 100 is usable for, for example, constituent materials of aircrafts.

Figure 16C:
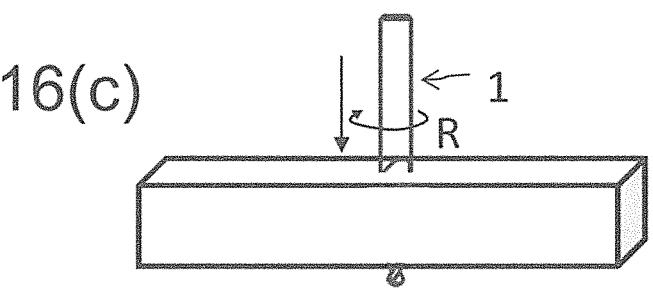

The subsequent step includes carrying out a cutting process so that a hole diameter is increased into a tapered shape and burr generated during a drilling process is removed at the opening of the hole 101 by using the tapered cutting edge as shown in FIG. 16C.

Figure 16D:
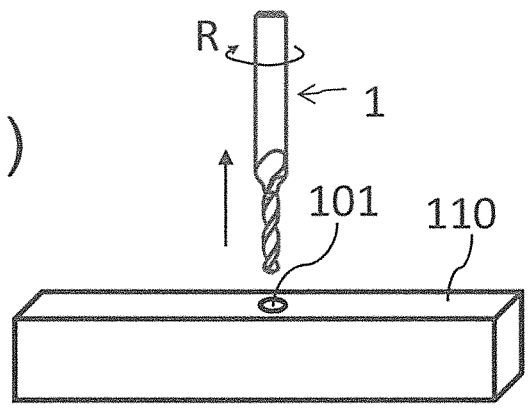

The subsequent step includes separating the workpiece 100 and the drill 1 from each other by pulling the drill 1 out of the through hole 101 in an arrowed direction as shown in FIG. 16D.

A desired machined product 110 is obtainable by subjecting the workpiece 100 to the drilling process through the foregoing steps. When the cutting process is continued, it is necessary to repeat the step of bringing the front end cutting edge and the tapered cutting edge of the drill 1 into contact with different portions of the workpiece 100, while the drill 1 is kept rotating.

DESCRIPTION OF REFERENCE NUMERALS 1 drill
2 shank portion
3 cutting portion
5 drilling portion
6 tapered portion
7 raised part
8 outer peripheral part
9 first helical flute
10 second helical flute
11 first cutting edge (front end cutting edge)
12 second cutting edge (tapered cutting edge)
13 margin part
14 front end flank surface
15 chisel edge part
16 thinning part
17 clearance part
19 small margin part
20 front region
21 rear region
22 cut out part
23 connection part
24 tapered flank surface
25 chamfered part
26 guide part
27 first leading edge
28 second leading edge P first end
Q second end
O rotation axis
L tapered cutting edge length in a front view of first end
w outer peripheral end width of chamfered part in a direction parallel to rotation axis
α axial inclination angle in second helical flute
β1 (β11, β12) helix angle of first helical flute
β2 helix angle of second helical flute
θ axial inclination angle of chamfered part
γ clearance angle of second cutting edge
ω1 inclination angle at outer peripheral end of margin part in front region
ω2 inclination angle at outer peripheral end of margin part in rear region
σ radial rake of second cutting edge

What is claimed is:

1. A drill, having an elongated shape and a rotation axis, and comprising:
    a drilling portion located on a first end side thereof, comprising:
        a first helical flute; and
        a first cutting edge located on the first end side of the first helical flute;
    a shank portion located on a second end side thereof; and
    a tapered portion located between the drilling portion and the shank portion, having a diameter larger on the second end side than on the first end side, and comprising:
        a second helical flute connected to the first helical flute;
        a second cutting edge located on the first end side of the second helical flute;
        a chamfered part located along the second cutting edge, and becoming smaller gradually as moving toward the first end side; and
        a connection part having a curved surface, and connecting the second cutting edge and the drilling portion,
    wherein w/L is in the range of 0.0015-0.5, where L is a length of the second cutting edge in a front view of the first end, and w is a width of an outer peripheral end of the chamfered part in a direction parallel to the rotation axis.

2. The drill according to claim 1, wherein the chamfered part comprises a terminal end on a side of the rotation axis at a position in connection with the connection part.

3. The drill according to claim 1, wherein a second helix angle of the second helical flute is larger than a first helix angle of the first helical flute.

4. The drill according to claim 1, wherein the chamfered part comprises an axial inclination angle in the range of 0-30°.

5. The drill according to claim 1, wherein a first axial inclination angle of the second helical flute at a side of the rotation axis is smaller than a second axial inclination angle of the second helical flute at a side of the outer periphery.

6. The drill according to claim 1, wherein the second cutting edge comprises a clearance angle in the range of 5-30°.

7. The drill according to claim 1, wherein the drilling portion comprises:
    a first leading edge extending from an outer peripheral end of the first cutting edge toward the second end side; and
    a margin part at an outer peripheral part of the drilling portion in contact with the first leading edge.

8. The drill according to claim 7, wherein a part of the margin part at a side of the first helical flute comprises a cutout on a side of the tapered portion.

9. The drill according to claim 7, wherein the drilling portion comprises a guide part having a larger width than the margin part and located at a side of the second end connecting to the connection part.

10. The drill according to claim 1, wherein a radial rake of the second cutting edge is in the range of −5° to −25°.

11. The drill according to claim 1, wherein the drilling portion comprises:
a margin part located at a front edge of an outer peripheral part of the drilling portion in a rotation direction of the drill; and
a small margin part located on a side of the tapered portion of the drilling portion, and having a cutout on a side of the first helical flute of the margin part.

12. The drill according to claim 11, wherein the cut out of the small margin part comprises a concave curved surface with respect to an opening part of the first helical flute in a sectional view.

13. The drill according to claim 11, wherein a second inclination angle at an end of the small margin part is smaller than a first inclination angle at an end of the margin part.

14. The drill according to claim 11, wherein a rake angle at the second cutting edge is smaller than an inclination angle at an end of the small margin part.

15. The drill according to claim 11, wherein a helix angle of the first helical flute at the small margin part is larger than a helix angle of the first helical flute at the margin part.

16. The drill according to claim 1, wherein the drilling portion comprises
a small diameter part located on the first end side,
a large diameter part on the second end side,
a step part located between the small diameter part and the large diameter part, and
a stepped cutting edge located at a side end edge of the step part of the first helical flute, and wherein the large diameter part comprises
a first large diameter part comprising the margin part disposed on a side of the small diameter part, and comprising no cutout on a side of the first helical flute, and
a second large diameter part comprising the small margin part disposed a side of the shank portion, and comprising a cutout on a side of the first helical flute of the margin part.

17. The drill according to claim 16, wherein a width of the small margin part of the second large diameter part is smaller than a width of the margin part of the first large diameter part.

18. The drill according to claim 16, wherein the small diameter part further comprises:
the margin part at a front edge of the outer peripheral part in a rotation direction of the drill; and
a width of the margin part in the small diameter part is smaller than a width of the margin part in the first large diameter part.

19. The drill according to claim 16, wherein, in a side view, a front end angle of the small diameter part is in the range of 90-130°, and
an angle between inclination angles of the step part is in the range of 130-150° and is larger than the front end angle.

20. A method of manufacturing a machined product, comprising:
rotating a drill according to claim 1;
drilling a hole by causing contact between the first cutting edge of the drill being rotated and a workpiece;
cutting an opening of the drilled hole by causing contact between the second cutting edge of the drill being rotated and the workpiece; and
pulling the drill out from a hole formed in the workpiece by separating the workpiece and the drill from each other.

* * * * *